(12) United States Patent
Fernandez Garcia et al.

(10) Patent No.: US 9,193,471 B2
(45) Date of Patent: Nov. 24, 2015

(54) SYSTEM FOR DETECTING THE STATUS OF A TUBE FOR FUEL TRANSFER (75) Inventors: Francisco Javier Fernandez Garcia, Madrid (ES); Santiago Flores Giraldo, Madrid (ES)

(73) Assignee: EADS Construcciones Aeronauticas, S.A., Madrid (ES)

( * ) Notice: Subject to any disclaimer, the term of this patent is extended or adjusted under 35 U.S.C. 154(b) by 430 days.

(21) Appl. No.: 13/409,299

(22) Filed: Mar. 1, 2012

(65) Prior Publication Data

US 2012/0305710 A1 Dec. 6, 2012

(30) Foreign Application Priority Data

Jun. 3, 2011 (ES) .................................. 201130929

(51) Int. Cl.
*B64D 39/06* (2006.01)

(52) U.S. Cl.
CPC ...................................... *B64D 39/06* (2013.01)

(58) Field of Classification Search
CPC ......... B64D 39/06; B64D 39/00; B64D 39/04

USPC ................................... 244/135 R, 135 A, 194
See application file for complete search history.

(56) References Cited

U.S. PATENT DOCUMENTS

| | | | | |
|---|---|---|---|---|
| 4,025,193 A | * | 5/1977 | Pond et al. | 356/5.1 |
| 4,158,885 A | * | 6/1979 | Neuberger | 701/300 |
| 7,152,828 B1 | * | 12/2006 | Garcia et al. | 244/135 A |
| 7,671,482 B2 | * | 3/2010 | Tighe | 307/9.1 |
| 2003/0136874 A1 | * | 7/2003 | Gjerdrum | 244/10 |
| 2006/0011164 A1 | * | 1/2006 | Kropinski et al. | 123/198 D |
| 2012/0013482 A1 | * | 1/2012 | Patel et al. | 340/854.8 |

* cited by examiner

*Primary Examiner* — Valentina Xavier
(74) *Attorney, Agent, or Firm* — Oblon, McClelland, Maier & Neustadt, L.L.P.

(57) ABSTRACT

A system for detecting the status of a tube for fuel transfer. It includes a nozzle for a telescoping tube employed in air to air refueling and transfer of fuel on a tanker aircraft with a system that detects the status of the connection of the nozzle with respect of a receptacle in a receiving aircraft, the system detecting the characteristics of the status of the connection of the nozzle in the receptacle by direct measurement of parameters in the nozzle itself of the tanker aircraft.

15 Claims, 8 Drawing Sheets

SYSTEM FOR DETECTING THE STATUS OF A TUBE FOR FUEL TRANSFER

FIELD OF THE INVENTION

The present invention refers to a system for detecting the status of the connection of a tube employed for refueling or transferring fuel. In particular, it refers to a system for detecting the status of the connection with a telescoping tube employed during air to air refueling and transferring fuel from a tanker aircraft to a receiver aircraft.

BACKGROUND

One of the methods currently used for operations of refueling or transferring comprises a telescoping tube, which in turn comprises a fixed part and a mobile part, having said mobile part the capacity to be extended telescopically with respect to the fixed part, carrying out in this manner the transfer of fuel from one tank to another.

For the specific case of air to air fuel transfer between a tanker aircraft and a receiver aircraft, this telescoping tube is normally directed by an operator or boomer stationed in the tanker aircraft and who operates said telescoping tube until the end of the same, called the nozzle, makes contact with a receptacle in the receiver aircraft. The end of the tube or nozzle comprises some latches. On the other side, the receptacle of the receiver aircraft comprises some triggers, normally activated by hydraulic means, said triggers having the purposes of attaching and blocking the nozzle of the telescoping tube by means of the clamps on said tube. Once the nozzle makes contact and connects to the receptacle, the boomer may commence the transfer of fuel from the tanker aircraft to the receiver aircraft in a safe manner.

Once refueling has finished, it is necessary to disconnect the telescoping tube from the receiving aircraft. Said disconnection is generally carried out in such a way that the boomer in the tanker aircraft issues an order for normal disconnection that consists in a request, by means of an electrical signal, to the triggers in the receptacle to free the latches of the telescoping tube that are retaining the end of the same in the receptacle of the receiving aircraft. Thus the triggers are retracted, freeing the latches on the nozzle of the telescoping tube. Once the nozzle has been completely freed, the boomer may then begin retracting the telescoping tube. In other cases, it is the receptacle in the receiving aircraft that initiates disconnection of the telescoping tube of the receiving aircraft, directly retracting the triggers of the receptacle and generating an electrical signal that informs the boomer in the tanker aircraft of the disconnection. Finally, the boomer in the tanker aircraft can also free the latches on the nozzle of the telescoping tube, including with the triggers of the receptacle closed by means of an integrated independent disconnection in the nozzle. In this final case, an electrical pulse is also generated to report the disconnection to the receptacle.

The systems known in the state of the art control the connection and disconnection of the nozzle of the telescoping tube from the receptacle on the receiving aircraft by means of some systems of induction coils, a primary system of induction coils located in the nozzle and a system of secondary induction coils deployed in the receptacle in such a way that the connection or disconnection of the nozzle from the receptacle is controlled by the characteristics of the current induced in the primary and secondary induction coil systems which are facing each other.

In this way, when the connection is made between the nozzle of the tanker aircraft with the receptacle in the receiving aircraft, the secondary induction coil system induces a current in the primary induction coil system in the nozzle, and by means of visual observation on the part of the boomer, he is able to detect that the nozzle is connected to the receptacle, subsequently commencing the refueling sequence manually. All of this implies controlling a process that is extremely delicate in a manual way and by means of induced magnitudes, which is not, therefore, as trustworthy a process as would be desired.

On the other hand, when the disconnection of the nozzle from the receptacle is ordered, the receiving aircraft indicates the activation of the disconnecting mechanism, sending an electrical signal that causes an electrical current in the secondary coil system to be created, which induces an electrical current in the primary coil system of the nozzle, indicating to the boomer that the disconnection of the nozzle from the receptacle is going to proceed. This means that latches of the nozzle begin to be freed, at the same time that the receptacle orders its triggers to begin withdrawing. Again in this case, the boomer in the tanker aircraft detects the disconnection process by means of induced measurements, and so the process is not as trustworthy as is should be for actions of this kind.

In the case in which the boomer is the one who initiates the disconnection by the normal system or by the independent disconnection system, the tanker aircraft generates a current on the primary induction coil system that induces a voltage in the secondary induction system of the receptacle. In this way the receiving aircraft detects through induced means the intention of the boomer of the tanker aircraft to disconnect the nozzle, or free the latches of the nozzle. This system is not completely reliable as would be desired for actions of this type, as they are carried out through induced means.

Furthermore, none of the documents of the known state of the art are able to provide information regarding the status of the connection of the nozzle of the telescoping tube with respect to the receptacle of the receiving aircraft. These known systems simply provide a physical means of communication between the induction coils of the receiving and tanker aircraft, in such a way that the status of the connection of the nozzle is simply "induced" from the count of the number of transitions transmitted by means of the nozzle. This is neither reliable nor capable of providing all of the information of the status of the connection that is needed to carry out a safe refueling process.

Consequently it would be desirable to have system available that would be able to detect the connection and disconnection of the nozzle of the telescoping tube of a tanker aircraft in the receptacle of the receiving aircraft during air to air fuel transfer operations in a reliable manner, such that it would also provide information with regard to the status of the connection of said nozzle in the receptacle to which fuel is being transferred. In this way this system should provide information on whether the nozzle is inserted in the receptacle, as well as information on the status of the latches of the nozzle and the triggers of the receptacle.

Hence the present invention is directed towards providing these functions.

SUMMARY OF THE INVENTION

The present invention refers to a system for carrying out the detection of the status of the connection of the nozzle of a telescoping tube employed in air to air refueling and transfer of fuel of a tanker aircraft with respect of the receptacle located on a receiving aircraft, such that this system is capable of the detection of the status of connection of the nozzle of the tanker aircraft in a direct manner without the need of taking measures in the receptacle or having to modify the configuration of said receptacle. Thus, on making use of the measure on magnitudes directly in the nozzle of the tanker aircraft, without using induced magnitudes or the count of pulsations received to induce the status of the system. The system of detection is much more reliable than those that currently existent in the state of the art.

The system of detection of the invention comprises in turn the following devices:
- a device for detecting the insertion of the nozzle of the telescoping tube in the receptacle of the receiving aircraft
- a device for detecting the status of the triggers of the receptacle (open or closed)
- a device for detecting the status of the latches of the nozzles (free or blocked)

Furthermore, there exist two possible embodiments of the invention of the device for detecting the insertion of the nozzle of the telescoping tube in the receptacle of the receiving aircraft: a variant of magnetic detection and a variant for detection by inductance variation.

Furthermore, according to the invention there exist two possible variants for detecting the latches of the nozzle: an indirect variant that acts on a solenoid in an independent system of disconnection, and a direct variant, that detects the position of the latches in the nozzle.

Other features and advantages of the present invention will be disclosed in the detailed description that follows the accompanying figures.

DETAILED DESCRIPTION OF THE INVENTION

The present invention refers to a nozzle 2 of a telescoping tube employed in the air to air refueling and transfer of fuel in a tanker aircraft, with respect to receptacle 4 located on a receiving aircraft, such that said nozzle 2 comprises a system for carrying out the detection of the status of the connection of nozzle 2 that is capable of carrying out the detection of the status of the connection of nozzle 2 to receptacle 4 in a direct manner by means of the measurement of parameters of nozzle 2 itself of the tanker aircraft, without the need of taking measurements in receptacle 4 or to modify the configuration of said receptacle 4.

Thus the system of detection comprises, in turn, the following devices to take the measurement of the selected parameters in nozzle 2 itself:
- a device 20 for the detection the insertion of nozzle 2 of the telescoping tube into receptacle 4 of the receiving aircraft
- a device 30 for the detection of the state of triggers 5 of receptacle 4 (open or closed)
- a device 40 for the detection of the state of latches 6 of nozzle 2 (free or blocked)

Figure 1:
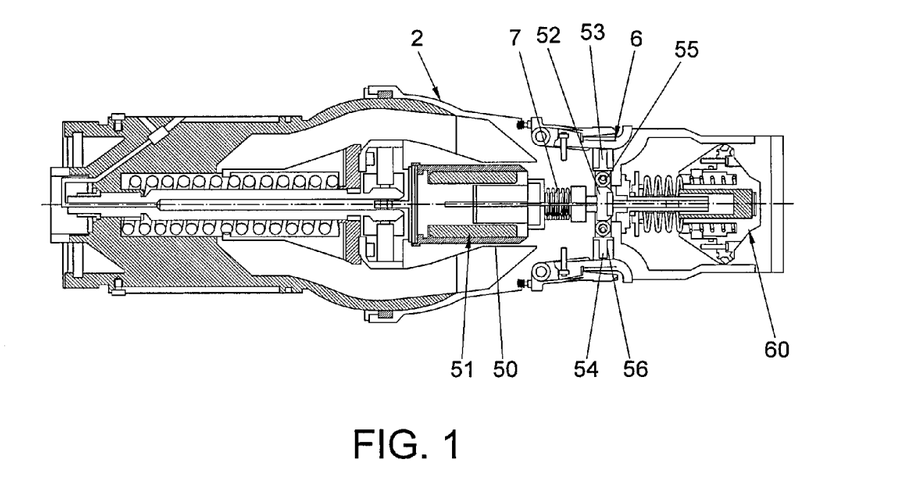
FIG. 1 shows a schematic section of the section of an air to air refueling nozzle in the current known state of the art.

The system of detection of the invention further comprises an independent disconnection device 50 of nozzle 2 of the telescoping tube. Said device 50 comprises a solenoid 51 joined to a piston with a ramp shaped cam 52, as can be seen in FIG. 1. Given that latches 6 of nozzle 2 rest on two pistons 53, 54 supported on rollers 55 that sustain the upper plane of piston with a ramp shaped cam 52, when solenoid 51, joined to said piston 52, is activated, said piston 52 is displaced (towards the left according to its representation in FIG. 1) dragged by solenoid 51, in such a way that the support of rollers 55 is withdrawn from pistons 53, 54, enabling the displacement of said rollers within their lodging guide 56, which in turn frees the displacement of latches 6 of nozzle 2, which are then pushed by an elastic element 7, preferably a spring, towards the center axel of nozzle 2.

When an air to air refueling is carried out between nozzle 2 and receptacle 4, a fault in the closing system of triggers 5 of receptacle 4 has been produced, a situation commonly called pressure refueling. Receptacle 4 cannot grasp nozzle 2, for which the boomer who operates the telescoping tube from the tanker aircraft has to constantly be exerting force so that nozzle 2 does not exit receptacle 4 during the transfer of fuel. In these cases, the boomer has to constantly control the force placed by nozzle 2 against receptacle 4, although it is also necessary to ensure that nozzle 2 and receptacle 4 are connected at all times. Therefore the system of the invention comprises a device 20 that reports the insertion of nozzle 2 on the telescoping tube into receptacle 4.

Figures 8A, 8B:
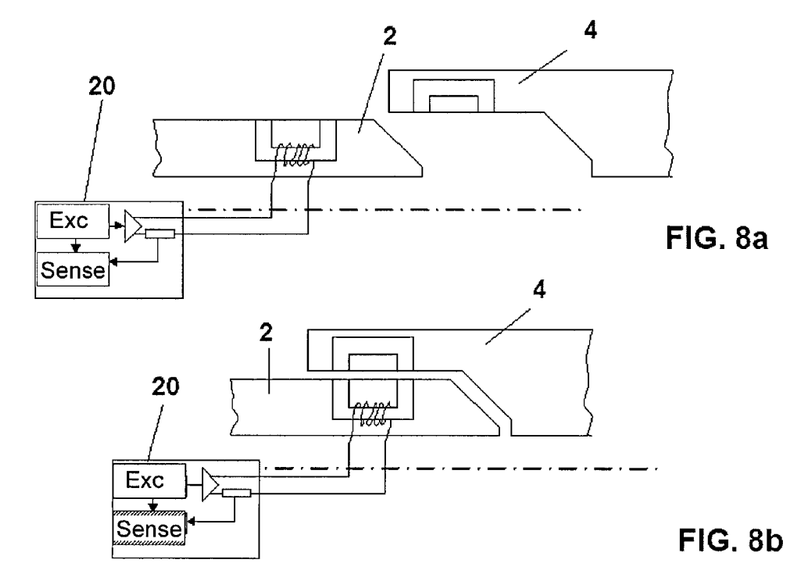
FIGS. 8a and 8b show a schematic section of the detection of the insertion of the nozzle of a telescoping tube employed in air to air refueling and transfer of fuel to the receptacle of a receiving aircraft in accordance with a first variant of the present invention by means of detection by inductance variation.
Figure 9A:
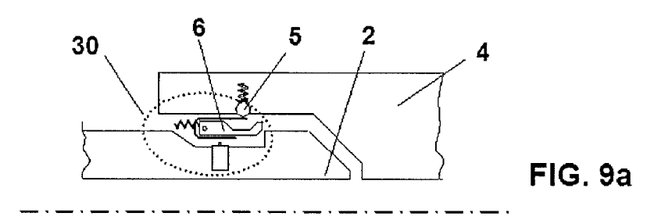
FIGS. 9a and 9b show a schematic section of the embodiment of the detection of the position of the triggers of the receptacle of a receiving aircraft in a system of detection in accordance with the present invention.
Figure 9B:
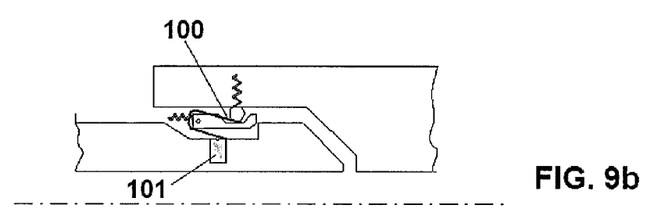

In accordance with a first variant of the invention, detection of insertion device 20 of nozzle 2 of the telescoping tube into receptacle 4 carries out detection by inductance variation by means of coil 61 of the primary coil induction system of nozzle 2, which faces the secondary coil induction system of receptacle 4, being said induction coil 61 wrapped around an open magnetic nucleus, in such a way that each end of said nucleus represents a magnetic pole when current circulates through coil 61. The inductance of coil 61 varies in function of whether nozzle 2 is outside of or is inserted into receptacle 4, in such a way that the inductance is greater in the second case (when nozzle 2 is inserted into receptacle 4). Thus, device 20 measures the variation of inductance between the two previous cases, when nozzle 2 is inside receptacle 4 and when it is not. In accordance with the invention, coil 61 is excited with alternate current, in such a way that the variation of inductance in said coil 61 is detected as a variation in the current, voltage, gap or resonance frequency of said alternating current. In this way device 20 directly measures, preferably by means of an electronic circuit, the value or change in the inductance of coil 61 of the primary system of solenoids of nozzle 2, determining by said measurement value or by the detection of a change in the value whether or not coil 2 is inserted into receptacle 4.

Preferably a permanent voltage excitation in coil 61 is used at a frequency greater than 20 KHz so that it is outside of audible range (it must be taken into account that the boomer and the operator in the receiving aircraft communicate by audio, and so this communication should not be interfered with). Subsequently the current of coil 61 is measured, filtered by a high-pass filter to eliminate components of the signal in audio frequency and analyze the resulting current (by amplitude, frequency or gap), which depends on the inductance of coil 61. This action also enables detecting a possible presence or loss of coil 61 or of nozzle 2 due to lack of current. Thus, coil 61 is excited by voltage having a frequency higher than 20 KHz, with low amplitude, lower than 3V approximately, so as not to induce a pulse in the receptor, in such a way that the receiving aircraft does not interpret the excitation received as connection or disconnection pulse.

Device 20 for detecting the insertion into nozzle 2 characterizes the inductance of coil 61 in both states (outside and inside receptacle 4), evaluating possible variations due to misalignments, gaps in rotation, etc. Device 20 does not involve making any physical modifications to nozzle 2, as it only requires developing an electronic excitation and signal conditioning.

Figure 2:
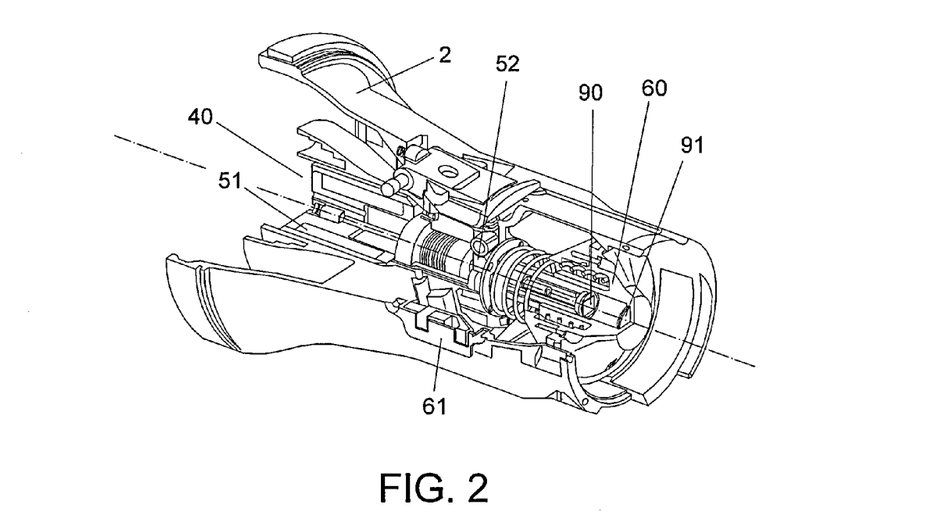
FIGS. 2 and 3 show a schematic section of a first variant of magnetic detection of a system for carrying out the detection of the state of the connection of a telescoping tube employed in air to air refueling and transfer of fuel to the receptacle of a receiving aircraft, in accordance with the present invention.
Figure 3:
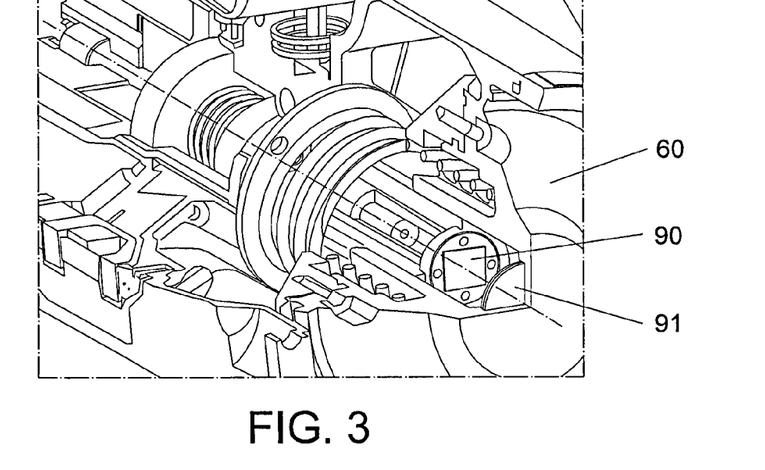
Figure 4A:
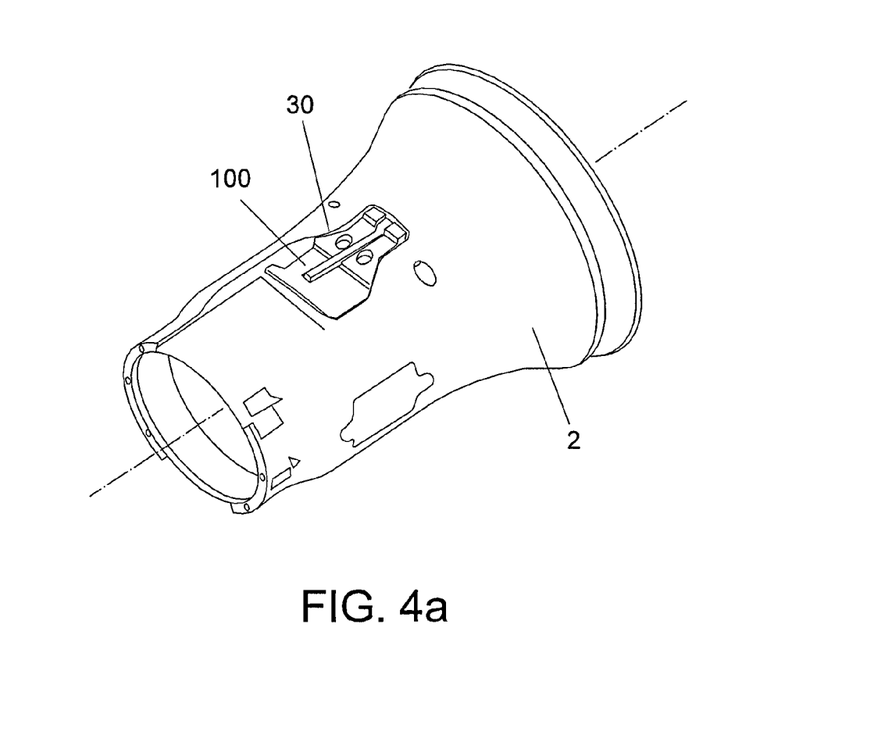
FIGS. 4a-4f show a schematic section of the position of the triggers of the receptacle of a receiving aircraft in a system of detection in accordance with the present invention.
Figure 4B:
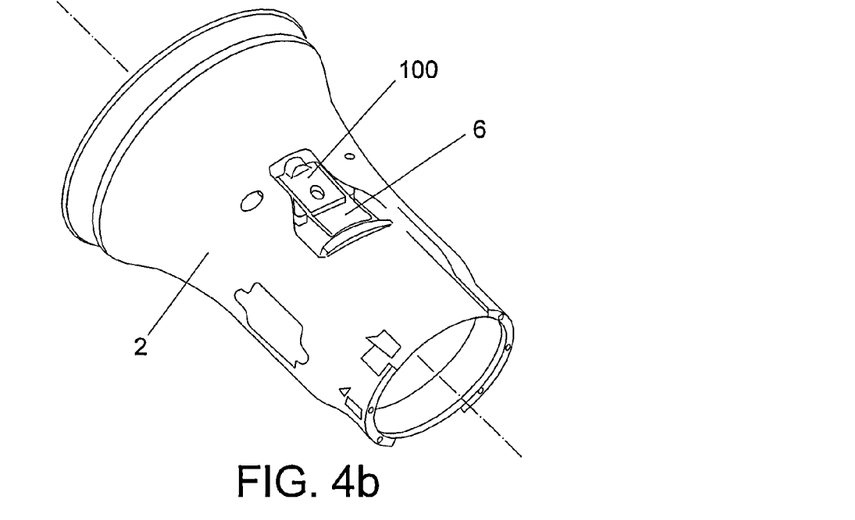
Figure 4C:
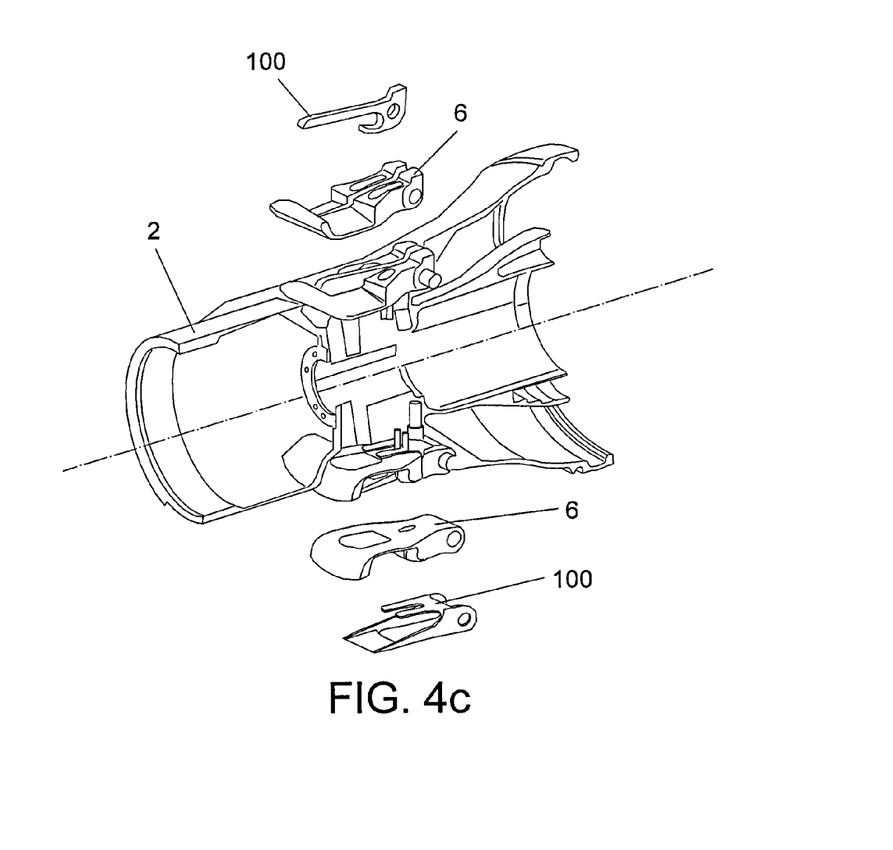
Figure 4D:
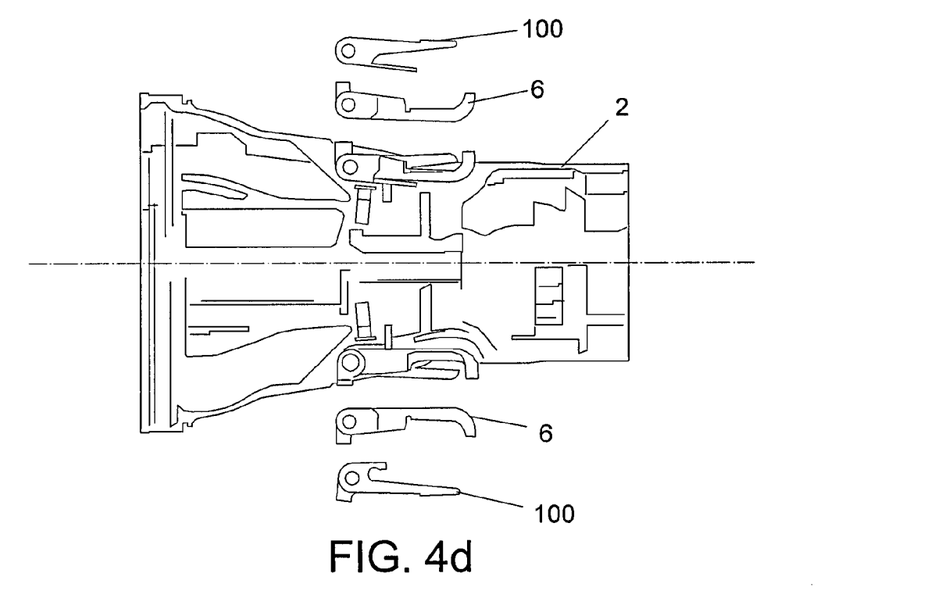
Figure 4E:
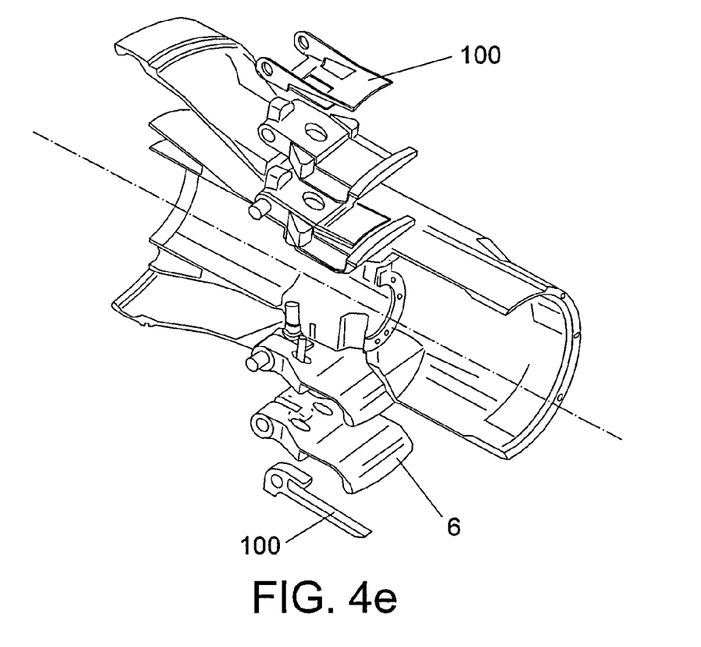
Figure 4F:
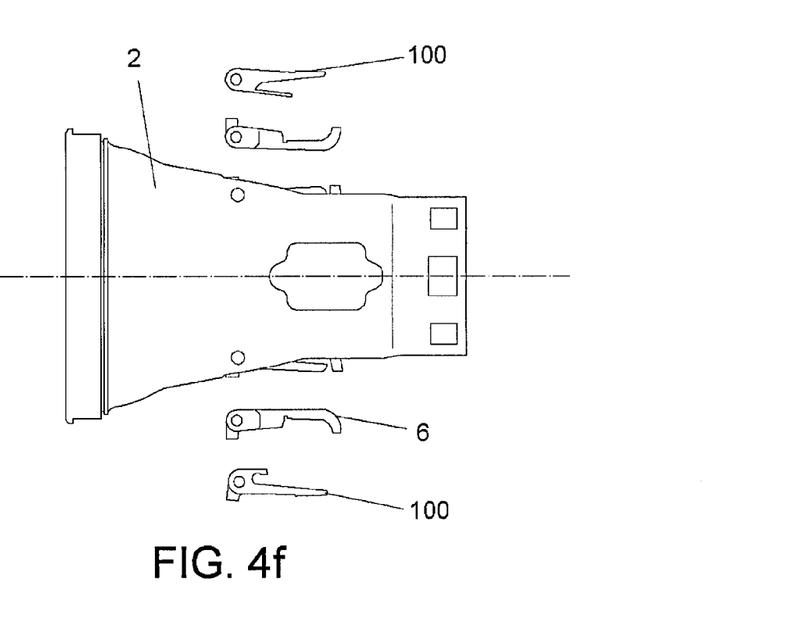

As shown in FIGS. 2 and 3, in accordance with a second variant of the invention, device 20 for detection of insertion into nozzle 2 on the telescoping tube into receptacle 4 performs a detection of displacement of a mobile element for the closing or opening of a cut off valve of the nozzle, in particular piston with a ramp shaped cam 60 that closes a cut off valve at the end of nozzle 2. When nozzle 2 is inserted into receptacle 4, said receptacle pushes piston with a ramp shaped cam 60 of the cut off valve, in such a way that said cut off valve remains open to enable the transfer of fuel. The displacement of piston with a ramp shaped cam 60 is detected by means of device 20 that comprises a proximity sensor 90 attached to the body of nozzle 2. Furthermore, piston with a ramp shaped cam 60 comprises a magnet 91, preferably a magnet made of rare earth materials having a circular shape that is attached on the interior base of said piston with a ramp shaped cam 60. Preferably proximity sensor 90 is a hall type sensor or other type of proximity detector with other technology (for example, inductive, capacitive, etc.), and is placed in nozzle 2, not in receptacle 4, in such a way that the measurement it takes is direct, not induced. Furthermore, said proximity sensor 90 performs the measurement without contact, which provides additional advantages because for it to be able to function correctly there is no wear, no need for an exact alignment in nozzle 2, and it requires very little useful space for its maneuvering. Thus, in accordance with the invention, the displacement of piston with a ramped shape cam 60 that closes the cut off valve at the end of nozzle 2 is taken advantage of for activating proximity sensor 90.

The system of detection of the invention further comprises a device 30 for the detection of the status of triggers 6 of receptacle 4: it detects whether triggers 5 are open or closed.

Thus, in accordance with the invention, to detect the status of said triggers 5, device 30 is added in nozzle 2 itself, in such a way that a direct measurement is performed on nozzle 2. Device 30 consists in adding to latches 6 of nozzle 2 a device 100 that is acted on directly by triggers 5 or receptacle 4, in such a way that the detection of the status of triggers 5 by the boomer in the tanker aircraft is direct and reliable.

Traditionally, once nozzle 2 is inside receptacle 4, said receptacle 4 activates a hydraulic actuator that closes its triggers 5. These triggers 5 overlap on latches 6 of nozzle 2, linking up with them in an axial direction for the transmission of the overall traction load.

In accordance with the invention, for the detection of what position triggers 5 of receptacle 4 are in on nozzle 2, latches 6 of nozzle 2 comprise a scale device 100 in the presence of triggers 5 of receptacle 4. Said scale device 100, in the presence of triggers 5 of receptacle 4, is for activating a non contact proximity sensor 101, preferably a microswitch, which is the element that provides the indication of device 30. Diverse possibilities for the configuration of scale device 100 are represented in FIGS. 4a to 4f.

Said microswitch 101 is placed (preferably screwed) on the cast body of nozzle 2, underneath latch 6 of nozzle 2, being activated upon approaching device 100, preferably an articulation on the same axis of the latches of the nozzle, for example, an articulated steel plate on the same axis of latch 6, such that said plate that forms device 100 is displaced by the presence of trigger 5 of receptacle 4. The connecting cables of microswitch 101 are available through the internal axel of nozzle 2. Consequently the changes to said nozzle 2 are minimal.

The employed microswitches 101 are commercially available, having the capacity to work in an explosive atmosphere, for which reason microswitches having a hermetic capsule would be preferable.

Figure 10A:
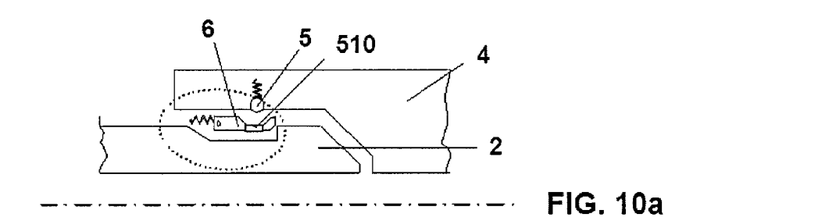
FIGS. 10a and 10b show a schematic section of the detection of the position of the triggers of the receptacle of a receiving aircraft by means of a force sensor in a system of detection in accordance with the present invention.
Figure 10B:
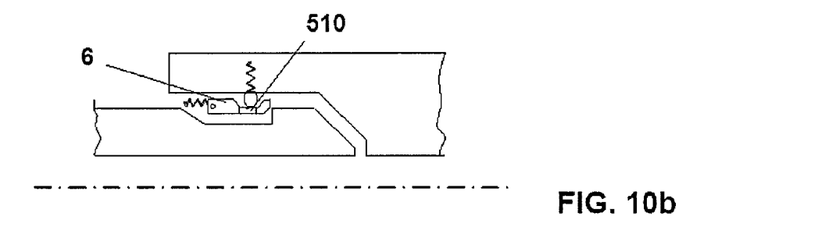
Figure 11A:
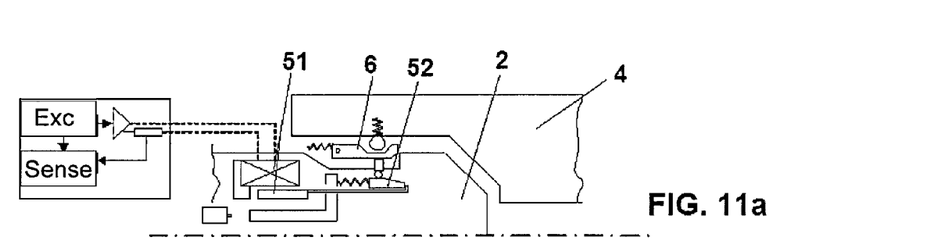
FIGS. 11a, 11b and 11c show a schematic section of the detection of the position of the latches of the nozzle, a system for carrying out the detection of the status of the connection of a telescoping tube employed in air to air refueling and transfer of fuel to the receptacle of a receiving aircraft in accordance with a first embodiment (FIG. 11b) and in accordance with a second embodiment (FIG. 11c) of the present invention.
Figure 11B:
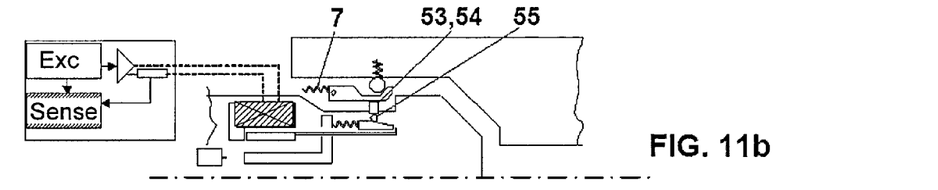
Figure 11C:
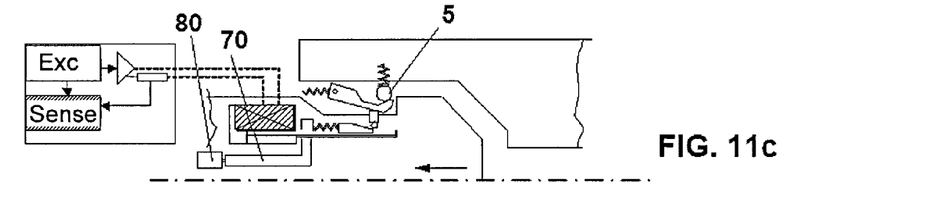

Another one of the possible embodiment of device 30 of the invention comprises at least one force sensor 510 deployed underneath latches 6 themselves of nozzle 2, in such a way that when triggers 5 of receptacle 6 latch onto latches 6 of nozzle 2, the force exercised by triggers 5 on latches 6 is measured by said force sensors. In the case of this embodiment it is not necessary for device 30 of the invention to comprise device 100 acted on directly by triggers 5 of receptacle 4.

Another one of the functionalities incorporated into the system of detection of the invention is that of detecting the status of latches 6 of nozzle 2, in such a way that it is determined whether said latches 6 are free or blocked. For this, the system of detection comprises a device 40.

In accordance with one embodiment of the invention, device 40 receives information directly from independent disconnection device 50, in such a way that it is detected whether the blocking mechanism of latches 6 of nozzle 2 is free or blocked, by means of the inductance itself of solenoid 51 of independent disconnection device 50.

Thus, the inductance of solenoid coil 51 will take on very different values when latches 6 are blocked (solenoid 51 is not activated) and when latches 6 are freed, solenoid 51 being activated and, in consequence, independent disconnection device 50. To this end, device 40 develops an electronic excitation of solenoid 51 that detects the variation of inductance in said solenoid 51.

For this purpose, device 40 comprises a high frequency excitation, preferably around 20 KHz, with several levels:
when independent disconnection device 50 is deactivated, the coil of solenoid 51 is excited with a very low service cycle so as to enable circulation of a low intensity, insufficient for the excitation of said solenoid 51, in such a way that the current ripple amplitude indicates the inductance of solenoid 51, and, therefore, its position to activate independent disconnection device 50, the coil of solenoid 51 is excited with a service cycle of 100% (28 Vdc), measuring the current during activation, seeking the slope of current change due to the displacement of solenoid 51. This detection indicates the freedom from the blockage of latches 6 of nozzle 2 following excitation, if it were needed to detect the condition of unblocking in a permanent manner, the service cycle is reduced to a value that enables the maintenance current of solenoid 51, in such a way that the current ripple amplitude of said current will indicate the new inductance of solenoid 51 and the position of the same With the method of this first embodiment of the invention for device 40, the displacement of the nucleus of solenoid 51 is detected, which drags piston with a ramp shaped cam 52 of nozzle 2 of approximately 3 mm, a sufficient value for placing pistons 53, 54 in a position in which they could be moved by being pushed by latches 6 of nozzle 2 (see FIG. 5). In this way, the detection of the status of the blocking mechanism of latches 6 of nozzle 2 is carried out directly from nozzle 6 itself, with no induced means whatsoever that could lead to mistakes being committed.

The method described also enables detection of a possible loss of the coil of solenoid 51 of independent disconnection device 50 or of nozzle 2 due to lack of current. The implementation of the described functionality does not require any modifications to nozzle 2, only the characterization of solenoid 51 being needed.

Figure 5:
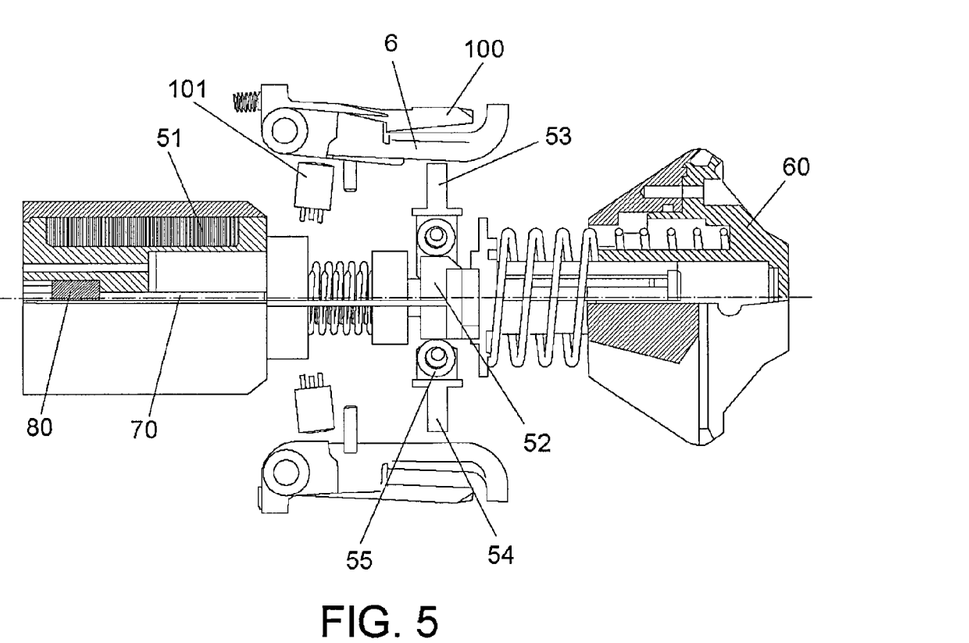
FIGS. 5, 6 and 7 show a schematic section of a second direct variant that detects the position of the latches in the nozzle of a system for carrying out the detection of the status of the connection of a telescoping tube employed in air to air refueling and transfer of fuel to the receptacle of a receiving aircraft in accordance with the present invention.
Figure 6:
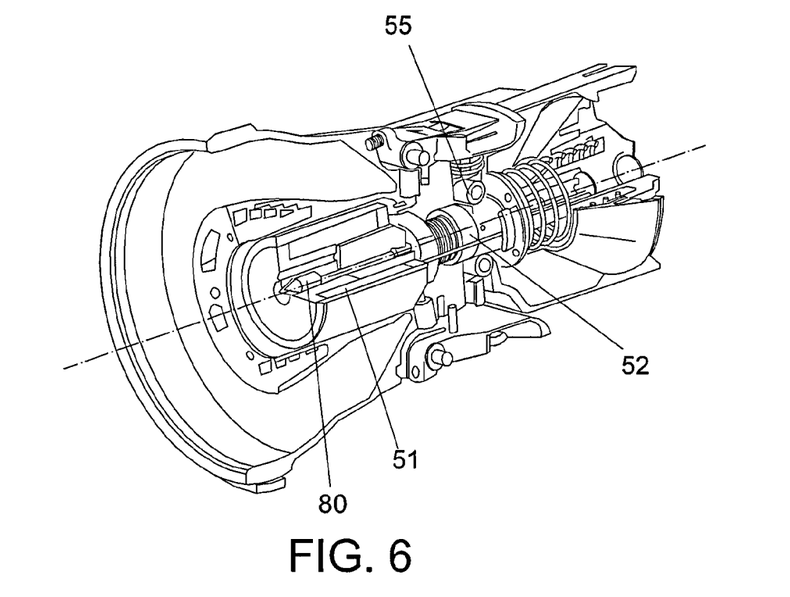
Figure 7:
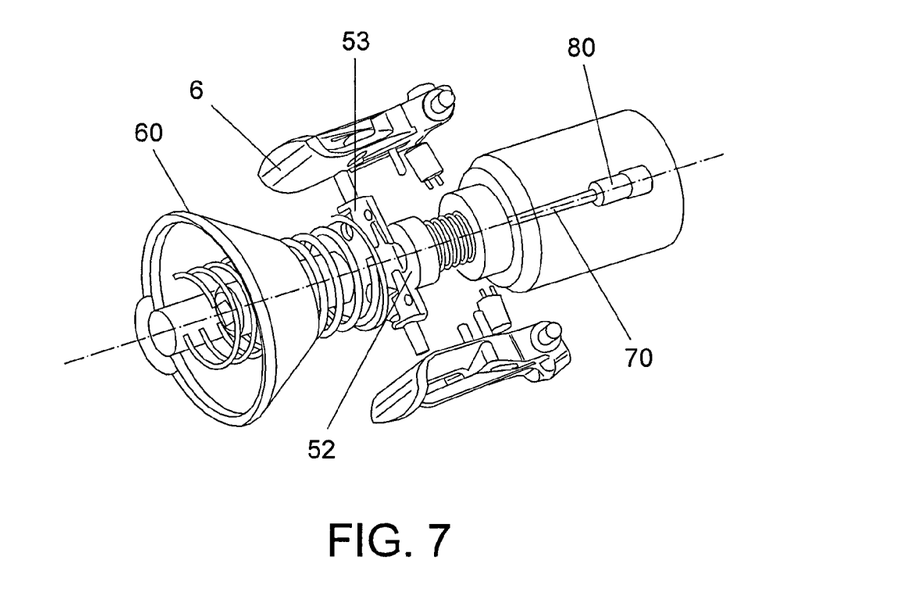

In accordance with a second realization of the invention, and in reference to FIGS. 5, 6, and 7, device 40 can detect in a direct manner the physical displacement of latches 6 of nozzle 2 from independent disconnection device 50. For the physical displacement of latches 6 to occur, it is necessary:

that independent disconnection device 50 be freed, this status being able to be detected in accordance with the previous description that triggers 5 of the receptacle are closed and there is a traction force on the nozzle: this force is what originates, due to the geometry of the contact between latches 6 of nozzle 2 and receptacle 4, a component of radial force on latches 6 of nozzle 2, provoking its displacement and liberation from nozzle 2.

Therefore, it could occur that independent disconnection device 50 is freed, but that latches 6 of nozzle 2 do not displace because the conditions of force on the nozzle have not occurred.

To detect the displacement of the latches from nozzle 2, it is necessary to measure the maximum displacement of piston with a ramp shaped cam 52. This displacement is forced by displacement of freed pistons 53, 54, pushed in turn by latches 6 of nozzles 2.

When solenoid 51 has been activated, piston with a ramp shaped cam 52 is displaced about 3mm, thus freeing independent disconnection device 50. In this position rollers 55, located between pistons 53, 54 and piston with ramp shaped cam 52, are supported above the inclined plane of piston with ramp shaped cam 52. The radial force exercised by latches 6 of the nozzle push pistons 53, 54 radially on inclined plane 61, forcing an axial displacement (towards the left in FIGS. 5, 6, 7) of piston with ramp shaped cam 52. This displacement is transmitted through a rod 70 up to microswitch 80 integrated in the nucleus of solenoid 51 of independent disconnection device 50.

In this way, microswitch 80 is only activated if latches 6 are in the free position.

The electric cables of microswitch 80 are run through the same path as those of solenoid 51 of independent disconnection device 50.

Although the instant invention has been disclosed entirely in connection with the preferred embodiments, it is clear that those modifications that are within its scope may be introduced, and that the invention should not be considered limited by the previous embodiments, but rather to the content of the following claims.

The invention claimed is:

1. A system employed in air for air refueling and transfer of fuel from a tanker aircraft to a receiving aircraft, said system comprising:
   a telescoping tube having a first end configured to connect to said tanker aircraft;
   a nozzle coupled to a second end of the telescoping tube and configured to connect to a receptacle in said receiving aircraft; and
   a detection system that detects a status of a connection of said nozzle with respect to said receptacle in the receiving aircraft, wherein said detection system including a detection device provided in said nozzle and which detects characteristics of the status of the connection of said nozzle in said receptacle by direct measurement of only parameters in the nozzle itself of the tanker aircraft.

2. A system in accordance with claim 1, wherein said detection device comprises a device deployed in the nozzle that detects insertion of said nozzle into said receptacle of the receiving aircraft, said device comprising a coil and an electronic sensor that measures a value or a variation of an inductance in a coil.

3. A system in accordance with claim 2, wherein the coil is excited from voltage with a frequency higher than 20 KHz, having an amplitude of less than approximately 3 V.

4. A system in accordance with claim 1, further comprising a proximity sensor attached to a body of said nozzle that measures a displacement of a piston with a ramp to close or open a cutoff valve of nozzle.

5. A system in accordance with claim 4, further comprising a magnet attached to the piston with the ramp, wherein said magnet functions together with said proximity sensor.

6. A system in accordance with claim 5, wherein said magnet is a magnet made of rare earth materials and said sensor is a Hall effect sensor.

7. A system in accordance with claim 1, wherein said nozzle further comprising at least one measuring device and a sensor placed in at least one of a plurality of latches of the nozzle such that triggers of the receptacle act on the measuring device when the nozzle is inserted into the receptacle then activating the sensor for the measuring device.

8. A system in accordance with claim 7, wherein the measuring device comprises an articulated piece on a same axis as latches of nozzle.

9. A system in accordance with claim 7, wherein the sensor comprises a microswitch with a hermetically sealed capsule for working in an explosive atmosphere.

10. A system in accordance with claim 1, wherein said nozzle further comprising at least a force sensor placed underneath at least one latch of the nozzle that close over triggers of the receptacle so as to measure a force exercised by at least one trigger of the receptacle on said at least one latch.

11. A system in accordance with claim 1, wherein said nozzle further comprising a device that detects whether some latches of the nozzle that close on some triggers of the receptacle are found free or blocked with respect to said triggers of the receptacle.

12. A system in accordance with claim 11, wherein the device comprises an electronic device that excites a solenoid with which an inductance is measured to determine a displacement of at least one piston with a ramp shaped cam of a blocking mechanism that frees opening or closing of triggers.

13. A system in accordance with claim 12, further comprising a sensor integrated into said nozzle that detects the displacement of the piston with the ramp shaped cam of a blocking mechanism that opens or closes triggers.

14. A tanker aircraft that comprises a system in accordance with claim 1.

15. A system in accordance with claim 1, wherein said detection device is provided only in the nozzle.

\* \* \* \* \*